Sept. 12, 1967     O. LLOYD     3,341,770

IONIZATION VACUUM GAUGE

Filed Aug. 3, 1964

3,341,770
IONIZATION VACUUM GAUGE
Owen Lloyd, Didcot, England, assignor to United Kingdom Atomic Energy Authority, London, England
Filed Aug. 3, 1964, Ser. No. 387,068
Claims priority, application Great Britain, Aug. 14, 1963, 32,209/63
2 Claims. (Cl. 324—33)

This invention relates to vacuum gauges.

Some known vacuum gauges determine the pressure of a gas by measuring the number of positive ions produced when molecules of the gas are bombarded with electrons of energy greater than their ionisation potential. In such gauges a negative electrode is used to collect the positive ions; the resulting current to the electrode being measured and being proportional to the gas pressure.

With these known gauges difficulties can arise where the gas pressure to be measured is very low. Firstly, the ion current may be so small that sensitive external amplifiers must be used. Secondly it is possible that the ion current may be so small as to be comparable in magnitude with currents flowing in parts of the apparatus normally considered to be insulating, for example, across glass surfaces.

One object of the present invention is to provide a vacuum gauge in which these difficulties are avoided.

According to the present invention, a vacuum gauge for investigating the pressure of a gas comprises an electrode gun, means to cause the gun to emit an electron beam, an electrically conducting chamber having an apertured end plate through which the electron beam passes into the chamber, means for immersing the chamber in a magnetic field which is parallel to the beam path and of such strength that the radius of gyration of the ions resulting from ionisation of the gas by the beam is less than the beam diameter, an electrostatic probe within the chamber adjacent to the beam path, and means to determine the time interval between voltage transients of the probe, the arrangement being such that each time a virtual cathode is created within the chamber one of said transients occurs, and after an interval which is dependent on the gas pressure the virtual cathode disappears and another of said transients occurs.

Preferably the electrostatic probe is an electrically conducting ring which encircles the beam path.

Figure 1:
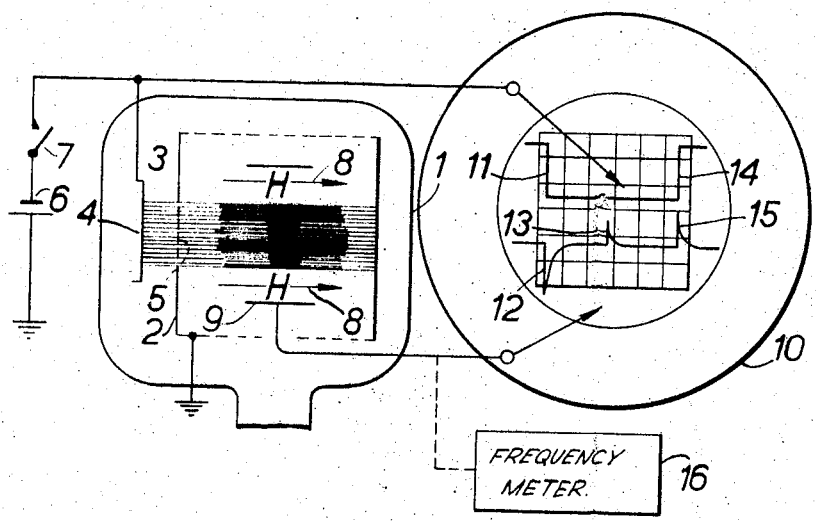
Figure 2:
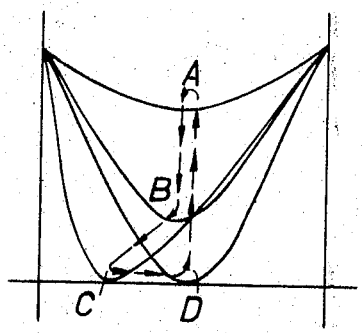

A vacuum gauge in accordance with the present invention will now be described by way of example with reference to the accompanying drawing in which FIGURE 1 shows the gauge diagrammatically and FIGURE 2 shows waveforms used in explaining the operation of the gauge.

The gauge comprises an envelope 1 which communicates with the vacuum system of which the gas pressure is to be measured, an electrically-conducting chamber 2, and a high perveance electron gun 3 which is arranged to emit an electron beam intermittently into the chamber 2. The cathode 4 and anode 5 of the gun 3 are arranged parallel to each other and rather less than 1 mm. apart. The cathode 4 is formed by a directly heated strip of tantalum approximately 1 cm. by 0.3 cm. which emits an electron beam, the path of which is indicated by the parallel lines, when energised from a high tension source 6 by closure of a switch 7. The anode 5 comprises a tungsten mesh, approximately 1 cm. by 0.5 cm., which is aligned with the cathode 4. The anode 5 forms part of one end plate of the chamber 2 and is electrically connected to it. The chamber 2 is earthed.

The chamber 2 is approximately 3 cms. in diameter and 2.5 cms. deep. The sides of the chamber 2 are formed of mesh, so that the gas, the pressure of which is to be measured, is able to enter freely.

In operation the chamber 2 is immersed in a magnetic field, indicated by the arrows 8, which is parallel to the beam path and of such strength that the electron beam is collimated and the radius of gyration of ions resulting from ionisation by the beam of the gas is less than the beam diameter. In some cases, for example where the gas pressure within a vessel used for plasma confinement experiments is to be measured, a suitable magnetic field may already be present. In other cases it is provided by a permanent magnet or electromagnet.

Supported within the chamber 2, but insulated from it, is an electrostatic probe formed by a ring 9 of nickel which encircles the beam path, a lead from the ring 9 being connected to a dual trace oscilloscope 10 to control one of the traces, the other trace being controlled by signals supplied over a connection from the cathode 4.

The operation of the gauge is then as follows. A cycle starts with closure of the switch 7 whereupon the cathode 3 is brought to a negative potential of about 60 volts and the electron beam starts to be emitted.

The appearance of the electron beam in the chamber 2 results in a change in the total charge in the chamber 2, and is recorded by a voltage transient of the ring 9. This is indicated in FIGURE 1, where the step 11 in the upper trace occurs when the switch 7 is closed and the voltage transient of the ring 9 appears as the spike 12 in the lower trace of the oscilloscope 10.

The electron beam current is greater than approximately 15 milliamps per square cm. and under these conditions a virtual cathode is created in the portion of the beam path encircled by the ring 9.

Some of the electrons in the beam collide with neutral molecules of the gas, so forming positive ions and secondary electrons. The ions remain trapped in the electron beam and partially neutralize the electron space charge.

After an interval which is dependent on the rate of production of ions, and hence on the gas pressure, the virtual cathode can no longer be sustained by the unneutralized part of the electron beam and disappears. This causes a second voltage transient of the ring 8 which results in a spike 13 in the lower trace of the oscilloscope 10, this defining the end of a time interval the duration of which is inversely proportional to the gas pressure. Measurement of this time interval therefore provides a measure of the gas pressure. In a particular case, a gas pressure of $5.10^{-9}$ torr. corresponds to a time interval of approximately 10 milliseconds.

After a suitable interval, 100 milliseconds in the particular example given, the switch 7 is opened causing the step 14 in the upper trace and the spike 15 in the lower trace of the oscilloscope 10. The gauge is then ready to make a fresh measurement.

To enable precise measurements to be made the gauge is first calibrated against a known pressure of the required gas.

In an alternative arrangement the oscilloscope 10 is replaced by a differentiating network connected to the ring 9, the output of this network being supplied to a time measuring device.

The gauge may also be operated in a slightly different way in which the switch 7 remains closed and the ring 9 is connected to a frequency meter 16 in place of the oscilloscope 10.

This mode of operation will be described with reference to FIGURE 2 which represents the potential distribution within the chamber 2. It can be shown that for suitable values of current a potential well forms within the chamber 2, the potential minimum in this well changing progressively from A to B and thence to C where a virtual cathode is formed. The neutralisation of the electron space charge then causes the potential minimum to move from C to D whereupon it relaxes back to A. When this relaxation occurs ions are lost from the well and a fresh cycle starts.

These cyclic relaxations give rise to an oscillatory signal in the ring 9, the frequency of this signal being measured by the meter 16. At least over a range of pressures (in one particular embodiment from about $5.10^{-7}$ to $5.10^{-9}$ torr.) the frequency is substantially proportional to the gas pressure, so enabling a measurement of the gas pressure to be made.

I claim:
1. A vacuum gauge for investigating the pressure of a gas comprising an electron gun, means to cause the gun to emit an electron beam, an electrically conducting chamber having an apertured end plate through which the electron beam passes into the chamber, means for immersing the chamber in a magnetic field which is parallel to the beam path and of such strength that the radius of gyration of the ions resulting from ionisation of the gas by the beam is less than the beam diameter, an electrostatic probe within the chamber adjacent to the beam path, and means to determine the time interval between voltage transients of the probe, the arrangement being such that each time a virtual cathode is created within the chamber one of said transient occurs, and after an interval which is dependent on the gas pressure the virtual cathode disappears and another of said transient occurs.

2. A vacuum gauge for investigating the pressure of a gas comprising an electron gun, means to cause the gun to emit an electron beam intermittently, an electrically conducting chamber having an apertured end plate through which the electron beam passes into the chamber, means for immersing the chamber in a magnetic field which is parallel to the beam path and of such strength that the radius of gyration of the ions resulting from ionisation of the gas by the beam is less than the beam diameter, an electrostatic probe within the chamber adjacent to the beam path, and means to determine the time interval between voltage transients of the probe, the arrangement being such that each time the beam starts a virtual cathode is created within the chamber and one of said transients occurs, and after an interval which is dependent on the gas pressure the virtual cathode disappears and another of said transients occurs, the beam ending subsequent to the second of these transients.

No references cited.

RUDOLPH V. ROLINEC, *Primary Examiner.*

C. F. ROBERTS, *Examiner.*